United States Patent
Alderrou et al.

(10) Patent No.: US 7,457,389 B2
(45) Date of Patent: Nov. 25, 2008

(54) DATA BLOCK SYNCHRONIZATION DEVICE, SYSTEM AND METHOD

(75) Inventors: Donald W. Alderrou, Sunnyvale, CA (US); Diem-Ha N. Tran, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 10/321,048

(22) Filed: Dec. 16, 2002

(65) Prior Publication Data

US 2004/0114699 A1    Jun. 17, 2004

(51) Int. Cl.
*H04L 7/00* (2006.01)

(52) U.S. Cl. ............. 375/368; 370/395.53; 370/395.62; 370/509; 370/510; 370/513; 370/514; 714/776

(58) Field of Classification Search .......... 370/247, 370/296; 375/354; 707/1; 709/220, 227
See application file for complete search history.

(56) References Cited

OTHER PUBLICATIONS

IEEE Draft P802.3ae/D5.0, clauses 46-49, May 1, 2002, pp. 271-341 and 343-389.
Office Action of Related Chinese Application Serial No. 200310120659.2 (*Intel Ref: P15224CN*), mailed Mar. 3, 2006, 4 pgs.

*Primary Examiner*—David C. Payne
*Assistant Examiner*—Adolf Dsouza
(74) *Attorney, Agent, or Firm*—Grossman, Tucker, Perreault & Pfleger, PLLC

(57) ABSTRACT

Described are a system, method and device to synchronize block data received in a data stream where the data stream is received on set data word increments. A synchronization header in each of a plurality of consecutive data word increments may be detected in a common location of a set portion or window of each consecutive fixed word increment. The data stream may be slipped by a fixed bit quantity in response to detecting an absence of the synchronization header in the common location of the set portion of a received data word increment.

17 Claims, 5 Drawing Sheets

DATA BLOCK SYNCHRONIZATION DEVICE, SYSTEM AND METHOD

BACKGROUND

1. Field

The subject matter disclosed herein relates to data communication. In particular, the subject matter disclosed herein relates to processing data received at a destination.

2. Information

Data is typically transmitted to a destination in data transmission medium as discrete quantities of data or data blocks. Data blocks typically comprise data that has been encoded and/or scrambled at a source prior to transmission. Upon receipt of such data blocks at a destination, the received data blocks may be de-scrambled or decoded to recover the transmitted data. Data blocks may be transmitted to a destination in a data stream where consecutive data blocks are separated by a synchronization header in the data stream. Data blocks may be parsed from the data stream or "aligned" by locating a predefined synchronization header separating the data blocks in the data stream. The parsed or aligned data blocks may then be de-scrambled or decoded.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
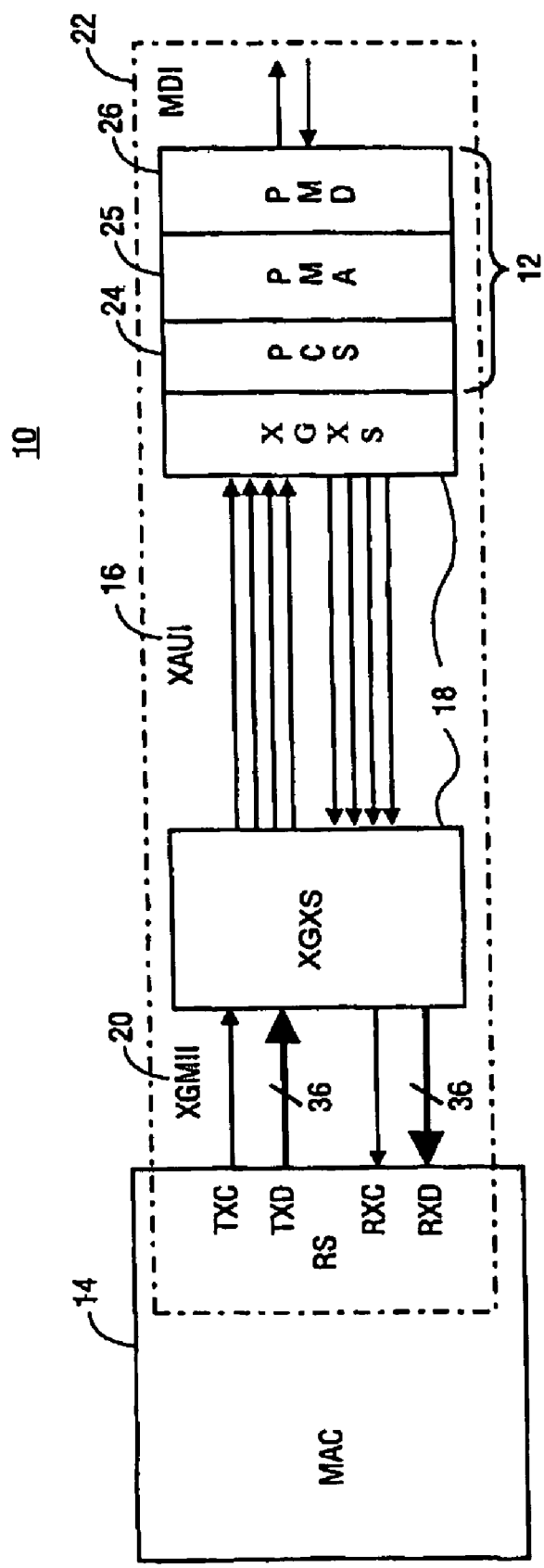
FIG. 1 shows a system to transmit data between two points according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Storage medium" as referred to herein relates to media capable of maintaining expressions which are perceivable by one or more machines. For example, a machine readable medium may comprise one or more storage devices for storing machine-readable instructions or data. Such storage devices may comprise storage media such as, for example, optical, magnetic or semiconductor storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and embodiments of the present invention are not limited in this respect.

A "data word" as referred to herein relates to a fixed quantity of data. For example, a data word may comprise a fixed quantity of ordered data bits. A data word may be of a predetermined length including sixteen bits, thirty-two bits, sixty-four bits or more. However, these are merely examples of a data word and embodiments of the present invention are not limited in these respects.

A "data stream" as referred to herein relates to data which is transmitted to a destination over a time period in sequentially transmitted units of data. A data stream may provide data to a destination at a uniform data rate. A data stream may also be provided to a destination in data word increments over a time period. However, these are merely examples of a data stream and embodiments of the present invention are not limited in these respects.

A "data frame" as referred to herein relates to a unit of data received at a destination. A data transmission may be partitioned into multiple ordered data frames for transmission to the destination. However, this is merely an example of a data frame and embodiments of the present invention are not limited in these respects.

A "data block" as referred to herein relates to a quantity of data that may be transmitted in a data frame. A data block may comprise a quantity of data that has been scrambled or encoded. Each data frame transmitted in a data stream with a plurality of data frames may comprise "synchronization header" to indicate the beginning of the data frame and to separate a data block portion of the data frame from a data block portion of a preceding data frame. However, these are merely examples of a data block and synchronization header, and embodiments of the present invention are not limited in these respects.

A "gearbox" as referred to herein relates to a device to receive parallel data at a first data width and provide the received data as parallel data at a second data width that is different from the first data width. In one example of a gearbox, the data throughput at an input with the first data width may be the same as the data throughput at an output with the second data width. However, this is merely an example of a gearbox and embodiments of the present invention are not limited in this respect.

A "slip" as referred to herein relates to a temporal translation of bits received in a data stream. For example, bits in a data stream may be slipped by a fixed number of bits by discarding the fixed number of bits. However, this is merely an example of how a data stream may be slipped and embodiments of the present invention are not limited in this respect.

Briefly, an embodiment of the present invention relates to a method and device to synchronize block data received in a data stream where the data stream is received on set data word increments. A synchronization header in each of a plurality of consecutive data word increments may be detected in a common location of a set portion of each consecutive fixed word increment. The data stream may be slipped by a fixed bit quantity in response to detecting an absence of the synchronization header in the common location of the set portion of a received data word increment. However, this is merely an example embodiment and other embodiments of the present invention are not limited in these respects.

FIG. 1 shows a system 10 to transmit data between two points in data lanes according to an embodiment of the present invention. A data transceiver 12 may transmit data to or receive data from a transmission medium through a media dependent interface (MDI) 22. For example, the data transceiver 12 may comprise a physical medium attachment (PMA) device 25, physical medium dependent (PMD) device 26 and a physical coding sublayer (PCS) device 24 to communicate with an optical transmission medium according to IEEE Std. 802.3ae-2002, clauses 48 through 51.

The system 10 may also comprise a media access control (MAC) device 14 to communicate with the data transceiver 12 through a media independent interface (MII) such as a 10 Gigabit MII (XGMII) 20 formed according to IEEE Std. 802.3ae-2002, clause 46. The MAC device 14 may also be coupled to any one of several types of input/output systems such as, for example, a multiplexed data bus or a switch fabric. However these are merely examples of how a MAC device may be integrated with a communication platform and embodiments of the present invention are not limited in these respects.

The MAC device 14 and PCS device 24 may be coupled to the data transceiver 12 by a serial data link such as 10 Gigabit Attachment Unit Interface (XAUI) 16 formed according to IEEE standard 802.3ae, clauses 47 and 48. XAUI 16 may be coupled between first and second XGMII extender sublayer (XGXS) circuits 18. The first and second XGXS circuits 18 may be coupled on a printed circuit board by traces extending up to approximately 50 cm. in a backplane configuration. However, this is merely an example of how a MAC device may be coupled to a data transceiver over a data link and embodiments of the present invention are not limited in these respects. In an alternative embodiment, for example, the PCS device 24 may be coupled directly to a MAC device at an XGMII independently of a XAUI or XGXS devices. Again, these are merely example of how a MAC device may be coupled to a data transceiver and other embodiments are not limited in this respect.

In the illustrated embodiment, the XGXS circuits 18 may transmit data across the XAUI 16 in multiple data lanes where each data lane transmits data in a particular direction either toward or away from the data transceiver 12. In the illustrated embodiment, data transmitted in different lanes in a time period to an XGXS circuit 18 may be recombined. Accordingly, the XGXS circuits 18 may deskew data transmitted on different data lanes to maintain proper alignment of the data received on the different data lanes.

Figure 2:
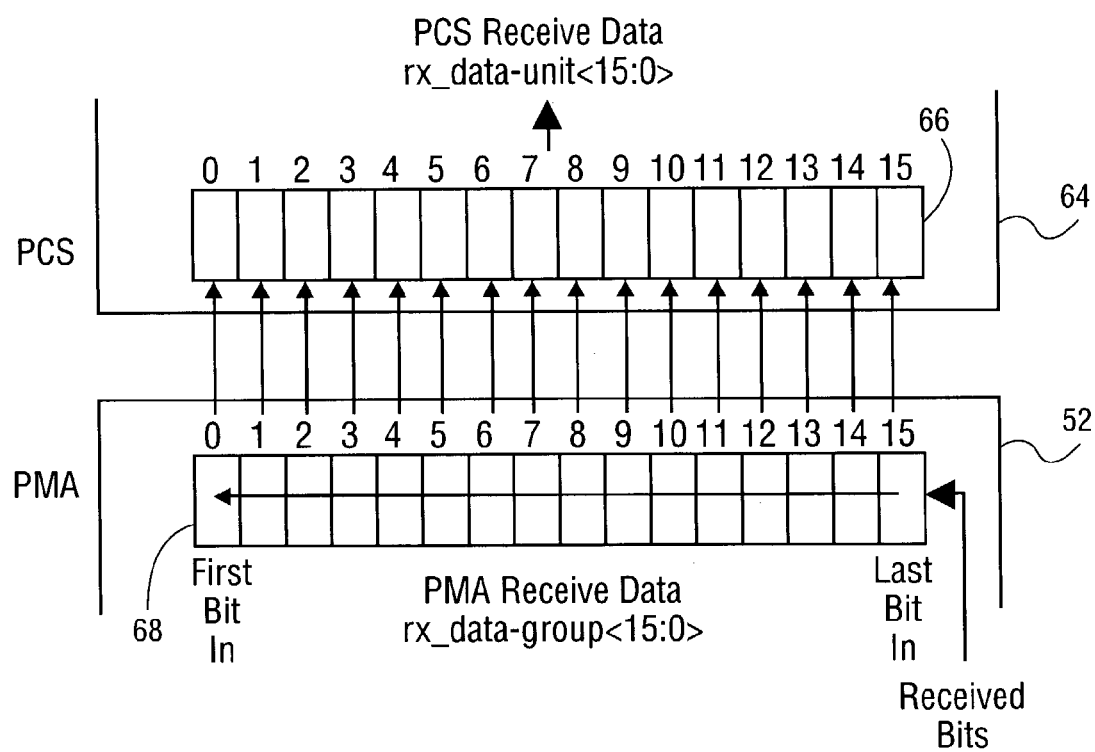
FIG. 2 shows an interface between a physical coding sublayer (PCS) device and physical media attachment (PMA) device according to an embodiment of the system shown in FIG. 1.

FIG. 2 shows an interface between a PCS device 64 and a PMA device 52 according to an embodiment of the system shown in FIG. 1. The PMA and PCS devices 52 and 64 may be formed in distinct semiconductor devices. Alternatively, the PMA and PCS devices 52 and 64 may be formed in a common semiconductor device. The PMA device 52 comprises an output interface 68 to provide a fixed width data word (e.g., a sixteen bit word as illustrated) from a serial data stream. The PCS device 64 comprises an input interface 66 to receive the fixed width data word from the output interface on discrete intervals.

According to an embodiment, the PMA device 52 may output unaligned data frames to the PCS device 64. For example, sixty-six bit data frames may be provided to the interface 66 in sixteen bit data words. Each data frame may comprise a sixty-four bit data block portion concatenated with a two bit synchronization header. Accordingly, a two bit synchronization header may separate consecutive sixty-six bit frames received at the interface 66 in sixteen bit increments.

Figure 3:
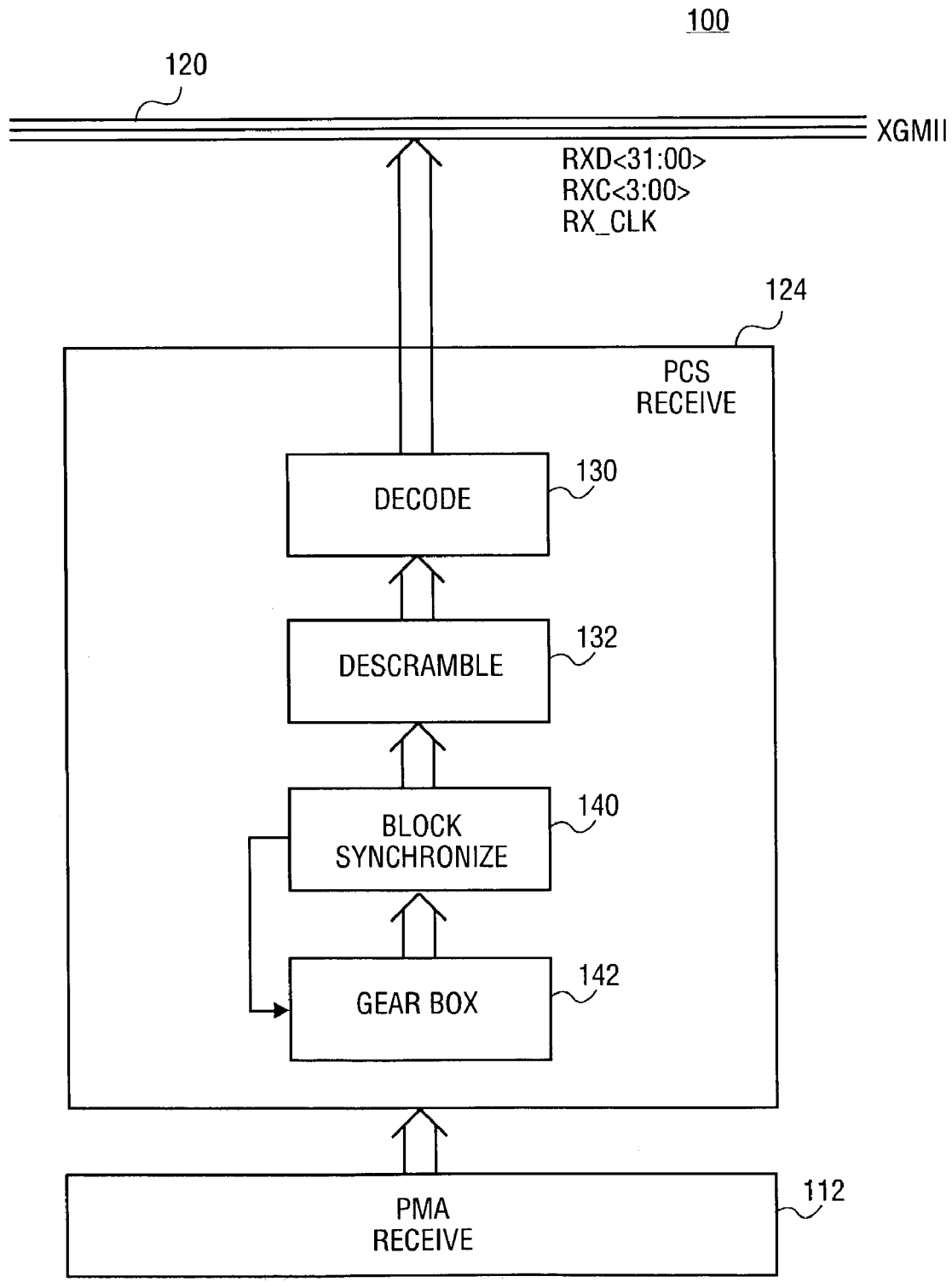
FIG. 3 shows a data receiver according to an embodiment of the system shown in FIG. 1.

FIG. 3 shows a data receiver according to an embodiment of the system shown in FIG. 1. A PMA device 112 may provide sixty-six bit data frames to a PCS device 124 in sixteen bit word increments as discussed above in FIG. 2. The PCS device 124 may comprise a gearbox section 142 to receive the sixteen bit words and a decode section 130 to provide Ethernet frames to an XGMII 120 as provided in IEEE Std. 802.3ae-2002, clause 49. A block synchronization section 140 may identify the sixty-six bit data frames based upon two bit wide synchronization headers. The descramble section 132 may then descramble the sixty-four bit data block portion to provide descrambled data to the decode section 130 as provided in IEEE Std. 802.3ae-2002, clause 49.

According to an embodiment, on each data interval, the gearbox section 142 may provide a sixty-six bit data word to the block synchronization section 140 from the sixteen bit words received from the PMA section 112. For example, the gearbox section 142 may provide the sixty-six bit data word from a data stream formed by concatenating bits from the received sixteen bit data words (e.g., forming a sixty-six bit word by concatenating bits of four received sixteen bit data words and a two bit portion of a fifth received sixteen bit data word). In providing the sixty-six bit data word, the gearbox section 142 may selectively slip a set number of bits in the received data stream (i.e., data stream from the concatenated sixteen bit data words) in response to a signal from the block synchronization section 140. For example, the gearbox section 142 may truncate or discard a fixed portion of the data stream to be used in forming the sixty-six bit data words.

Figure 4:
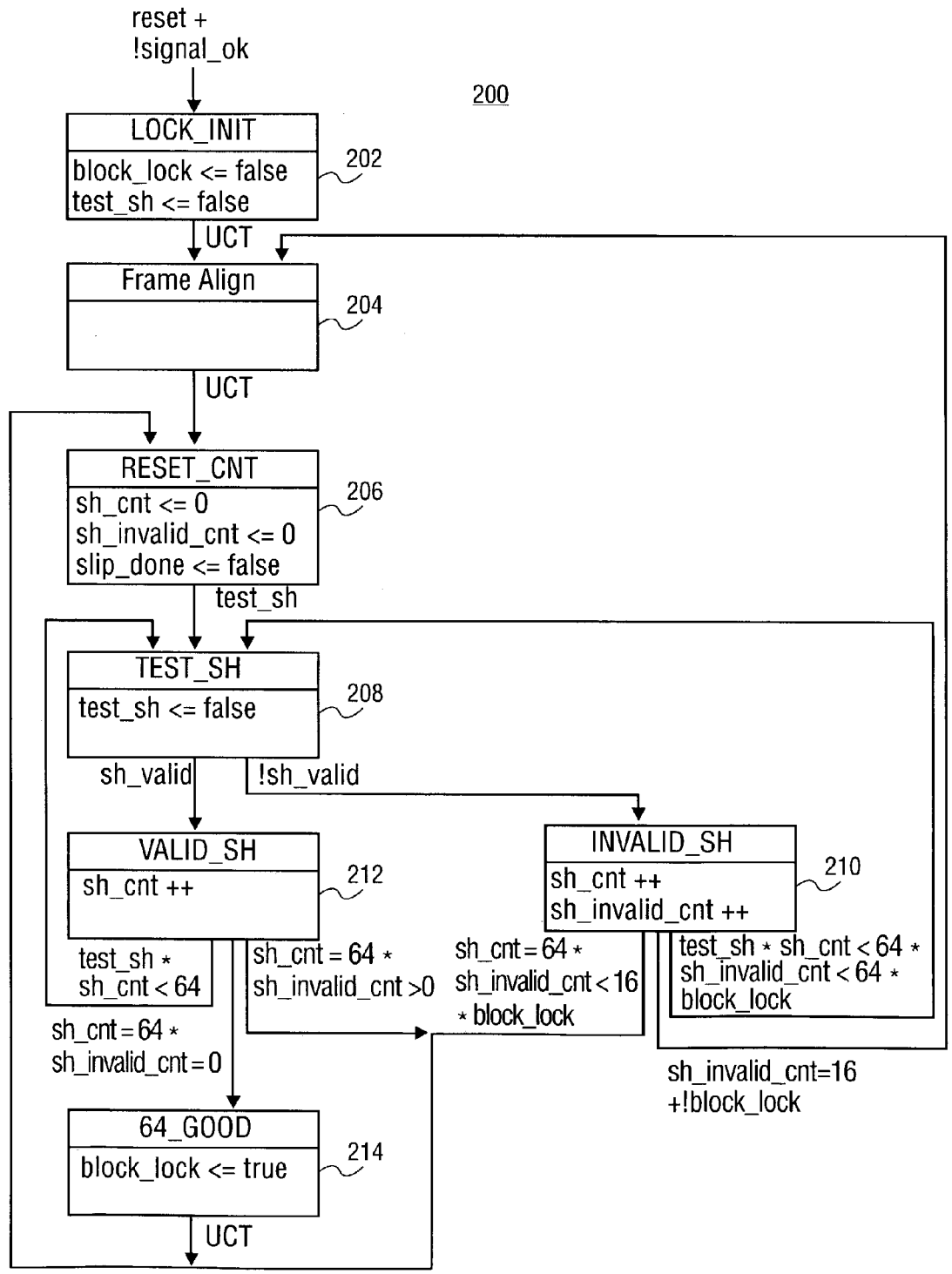
FIG. 4 shows an algorithm to synchronize receipt of data blocks at a PCS device according to an embodiment of the block synchronization section shown in FIG. 3.
Figure 5:
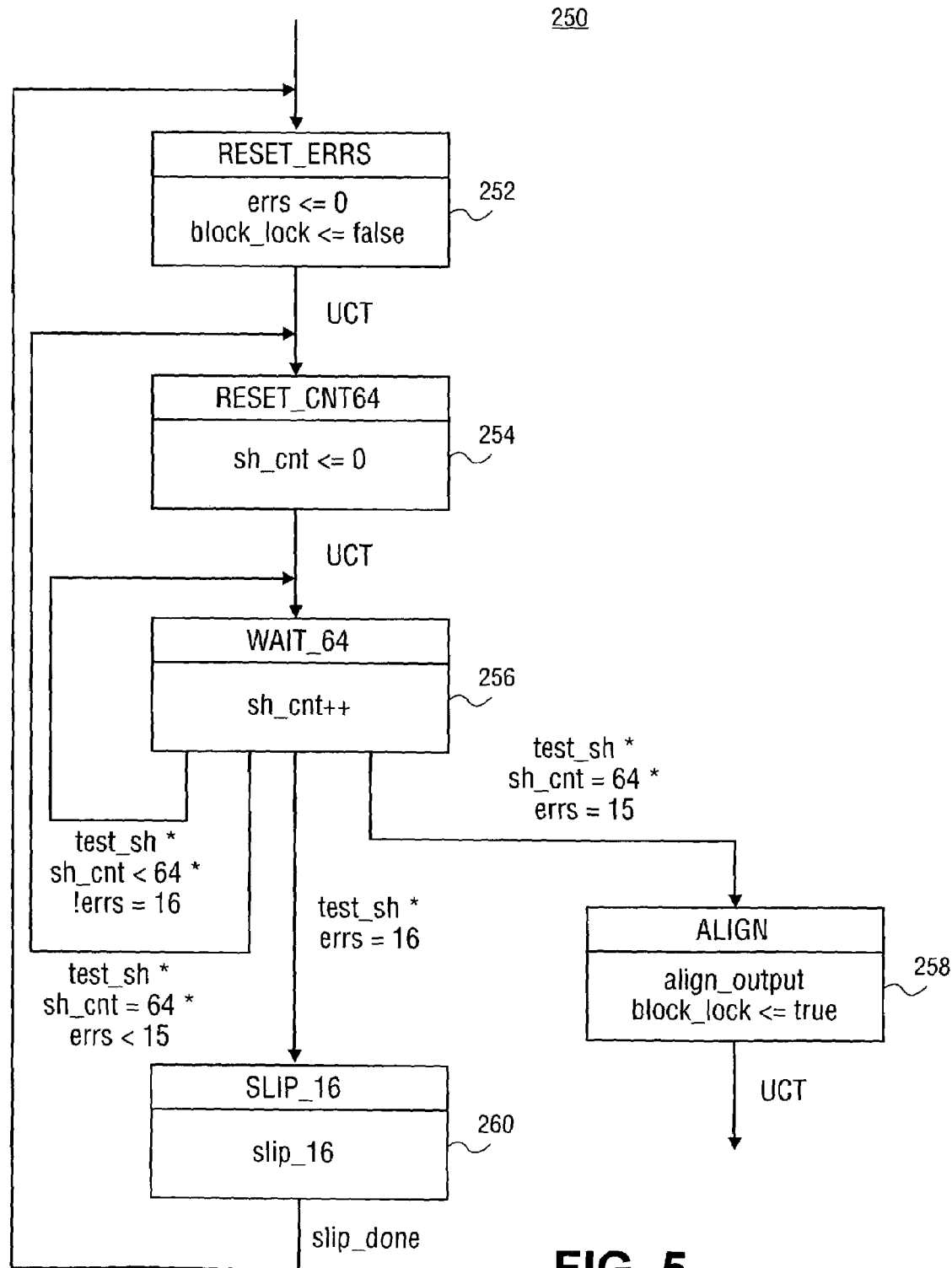
FIG. 5 shows a diagram illustrating state transitions in an algorithm to locate a synchronization header in data frames according to an embodiment of the algorithm illustrated in FIG. 4.

FIGS. 4 and 5 show state diagrams illustrating a process to synchronize receipt of data blocks at a PCS device according to an embodiment of the block synchronization section 140 shown in FIG. 3. A reset event (e.g., a power up event) may transition to a LOCK_INIT state 202 which unconditionally transitions to a FRAME_ALIGN state 204. As discussed with reference to FIG. 5, the FRAME_ALIGN state 204 may detect a position of a two bit synchronization header in a common location of the sixty-six bit data words received from the gearbox section 142. Based upon the detected position of the synchronization header in each sixty-six bit data frame, a sixty-four bit data block may be extracted from the sixty-six bit data frame.

States 206 through 214 relate to monitoring a bit error rate (BER) for a set number of consecutive sixty-six bit data frames (e.g., sixty-four consecutive sixty-six bit data frames).

The synchronization header in each consecutive sixty-six bit data frame may be tested at state 208. If each of the set number of consecutive sixty-six bit data frames is received without synchronization header errors, the location of the synchronization header may be validated at state 214. If an invalid bit synchronization header is detected at state 208, state 210 may increment a count of invalid synchronization header detections and selectively return to the state 208 if less than the set number of consecutive sixty-six bit data frames have been tested. If the set number of consecutive sixty-six bit data frames have been tested and the number of invalid synchronization header detections is below a threshold (e.g., between zero and sixteen), states 212 and 212 will transition to state 206. If the threshold number of invalid synchronization headers is detected in the set number of consecutive sixty-six bit data frames, the frame alignment process is initiated by transitioning from state 210 to 204.

FIG. 5 shows a state diagram illustrating a process to align sixty-six bit data frames according to an embodiment of state 204 in the process shown in FIG. 4. State 252 may be initiated from a transition from state 202 (FIG. 4). According to an embodiment, state 256 attempts to detect a presence of a two-bit synchronization header in each of a set number of consecutive sixty-six bit data words (e.g., sixty-four consecutive data words as shown in the presently illustrated embodiment). The synchronization header may comprise a set bit pattern such as, for example, "10" or "01." However, these are merely examples of a bit pattern that may be used as a synchronization header in a data stream to mark the beginning of a data frame, and embodiments of the present invention are not limited in these respects.

Rather than search the entire sixty-six bit data word for the synchronization header (one synchronization header position at a time), state 256 may search for the presence of the synchronization header in a common location of a set portion or window of each consecutive sixty-six bit data word. In the presently illustrated embodiment, for example, state 256 may merely attempt to detect the presence of the synchronization header in a common location in the first sixteen bits of each of the set number of sixty-six bit data words. For a two-bit synchronization header, for example, the common location of the synchronization header may be in any one of sixteen positions in the sixteen-bit window.

If the synchronization header is detected in the same location of the sixteen bit window of each of the set number of sixty-six bit data words, an alignment of the data frames may be determined at state 258. An output value "align_output" may represent the common location of the synchronization header in each of the sixty-six bit data words for use by the descramble section 132 (FIG. 3) in identifying sixty-four bit data blocks in the data stream of sixty-six bit data words.

State 256 may also detect an absence of the synchronization header in a common location of the window of one or more of the set number of sixty-six bit data words. For example, state 256 may detect the absence of the synchronization header by failing to detect the presence of the synchronization header in the same location of the first sixteen bits of each of the set number of sixty-six bit data words. Accordingly, state 256 may detect the absence of the synchronization header in the common location of any of the sixty-six bit data words. A transition to state 260 in response to detecting the absence of the synchronization header may then cause the block synchronization section 140 to provide a slip signal to the gearbox section 142. In response to the slip signal, the gearbox section 142 may slip the received data stream (e.g., the data stream used to form the sixty-six bit data words) by a set number of bits (e.g., sixteen bits to correspond with the length of the window used for locating a synchronization header).

By slipping the data stream by the size of the window, state 256 may search for the synchronization header in the next sixteen bit window portion of each of a subsequent set number of consecutive sixty-six bit data words (e.g., subsequent sixty-four consecutive sixty-six bit data words). While state 256 may continue to search for the synchronization header in a window of the first sixteen bits of each sixty-six bit data word received from the gearbox section 142, the data stream has been shifted by sixteen bits in response to the slip at state 260. If a bit sequence representing the synchronization header is detected in more than one position of a sixteen bit widow in each of the set number of sixty-six bit data words, a data word counter "sh_cnt" may be reset to zero to enable testing another set number of consecutive sixty-six bit data words.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a 10 Gigabit Ethernet Extended Sublayer (XGXS) device; and
   a physical coding sublayer device comprising:
      a 10 Gigabit Media Independent Interface (XGMII) coupled to the XGXS device;
      a decoder to provide data frames to the XGMII in response to synchronized data; and
      a data synchronization section to provide the synchronized data to the decoder in response to a data stream, the data synchronization section comprising:
      logic to test a synchronization header in each of a plurality of consecutive data frames to determine if the synchronization header is valid in each of the consecutive data frames;
      a detector, responsive to a determination that a synchronization header is invalid in at least one of the consecutive data frames, to detect a synchronization header in each of a plurality of consecutive fixed word increments in a common location of a set portion of each consecutive fixed word increment and to determine an alignment of data blocks in the data stream in response to locating the synchronization header in the common location in the set number of consecutive fixed word increments, wherein the alignment corresponds to the common location, and wherein the set portion comprises a set number of data bits providing a plurality of possible locations for the synchronization header, wherein the detector is configured to search the set portion for the synchronization header without slipping the data stream; and
      gearbox logic to slip the data stream by a fixed bit quantity in a single slip operation in response to detecting an absence of the synchronization header in the common location of the set portion of a received fixed word increment, wherein the fixed bit quantity is an amount equal to the set number of data bits in the set portion.

2. The system of claim 1, wherein the system comprises a first XGXS device coupled to the XGMII and a second XGXS device coupled to the first XGXS device over a 10 Gigabit Ethernet Attachment Unit Interface (XAUI).

3. The system of claim 1, the system further comprising a media access controller coupled to the XGMII.

4. The system of claim 1, wherein the system further comprises a physical media attachment device to provide the data stream to the physical media attachment device in response to a data signal.

5. The system of claim 4, wherein the system further comprises a physical media dependent device to provide the data signal in response to a signal received on an optical transmission medium.

6. A method comprising:
receiving a data stream on set data word increments;
testing a synchronization header in each of a plurality of consecutive data frames to determine if the synchronization header is valid in each of the consecutive data frames;
responsive to a determination that a synchronization header is invalid in at least one of the consecutive data frames, searching for a synchronization header in a common location of a set portion of each of a plurality of consecutive received data word increments without slipping the data stream;
detecting a presence of the synchronization header in each of the plurality of consecutive received data word increments in a common location of the set portion of each consecutive data word increment, wherein the set portion comprises a set number of data bits providing a plurality of possible locations for the synchronization header;
determining an alignment of data blocks in the data stream in response to locating the synchronization header in the common location in a set number of consecutive data word increments, wherein the alignment corresponds to the common location; and
slipping the data stream by a fixed bit quantity in a single slip operation in response to detecting an absence of the synchronization header in a common location of the set portion in at least one received data word increment, and wherein the fixed bit quantity is an amount equal to the set number of data bits in the set portion.

7. The method of claim 6, wherein the fixed word increments comprise sixty-six bits.

8. The method of claim 7, wherein the set portion in each data word increment comprises sixteen data bits.

9. The method of claim 8, wherein the synchronization header comprises a set pattern of two bits.

10. An apparatus comprising:
an interface to receive a data stream on data word increments;
a detector to detect a synchronization header in each of a plurality of received consecutive data word increments in a common location of a set portion of each consecutive data word increment, wherein the set portion comprises a set number of data bits providing a plurality of possible locations for the synchronization header, and wherein the detector comprises logic to determine an alignment of data blocks in the data stream in response to locating the synchronization header in the common location in the set number of consecutive data word increments, wherein the alignment corresponds to the common location, wherein the detector is configured to search the set portion for the synchronization header without slipping the data stream; and
a gearbox to slip the data stream by a fixed bit quantity in a single slip operation in response to detecting an absence of the synchronization header in the common location of the set portion of a received data word increment, and wherein the fixed bit quantity is an amount equal to the set number of data bits in the set portion.

11. The apparatus of claim 10, wherein the fixed word increments comprise sixty-six bits.

12. The apparatus of claim 11, wherein the set portion in each data word increment comprises sixteen data bits.

13. The apparatus of claim 12, wherein the synchronization header comprises a set pattern of two bits.

14. An apparatus comprising:
means for receiving a data stream on set data word increments;
means for testing a synchronization header in each of a plurality of consecutive data frames to determine if the synchronization header is valid in each of the consecutive data frames;
means, responsive to a determination that a synchronization header is invalid in at least one of the consecutive data frames, for searching for a synchronization header in a common location of a set portion of each of a plurality of consecutive received data word increments without slipping the data stream;
means for detecting a presence of the synchronization header in each of the plurality of consecutive received data word increments in a common location of the set portion of each consecutive data word increment, wherein the set portion comprises a set number of data bits providing a plurality of possible locations for the synchronization header;
means for determining an alignment of data blocks in the data stream in response to locating the synchronization header in the common location in the set number of consecutive data word increments, wherein the alignment corresponds to the common location; and
means for slipping the data stream by a fixed bit quantity in a single slip operation in response to detecting an absence of the synchronization header in a common location of the set portion in at least one received data word increment, and wherein the fixed bit quantity is an amount equal to the set number of data bits in the set portion.

15. The apparatus of claim 14, wherein the fixed word increments comprise sixty-six bits.

16. The apparatus of claim 15, wherein the set portion in each data word increment comprises sixteen data bits.

17. The apparatus of claim 16, wherein the synchronization header comprises a set pattern of two bits.

* * * * *